United States Patent
Gehrig et al.

(10) Patent No.: US 11,345,636 B2
(45) Date of Patent: May 31, 2022

(54) DISALT AS ROBUST PRIMARY SURFACTANT FOR CALCIUM SULFATE MIXTURES CONTAINING RECYCLED GYPSUM

(71) Applicants: BASF SE, Ludwigshafen am Rhein (DE); Saint-Gobain Placo, Courbevoie (FR)

(72) Inventors: Uwe Gehrig, Trostberg (DE); Fabian Niedermair, Trostberg (DE); Joachim Dengler, Trostberg (DE); Georg Daxenberger, Trostberg (DE); Hamouda Jaffel, Aulnay-sous-Bois (FR)

(73) Assignees: BASF SE; SAINT-GOBAIN PLACO

( * ) Notice: Subject to any disclaimer, the term of this patent is extended or adjusted under 35 U.S.C. 154(b) by 0 days.

(21) Appl. No.: 16/755,778

(22) PCT Filed: Oct. 18, 2018

(86) PCT No.: PCT/EP2018/078575
§ 371 (c)(1),
(2) Date: Apr. 13, 2020

(87) PCT Pub. No.: WO2019/081344
PCT Pub. Date: May 2, 2019

(65) Prior Publication Data
US 2021/0188712 A1  Jun. 24, 2021

(30) Foreign Application Priority Data

Oct. 24, 2017 (EP) ..................................... 17198015

(51) Int. Cl.
| | |
|---|---|
| C04B 28/14 | (2006.01) |
| C04B 18/16 | (2006.01) |
| C04B 24/16 | (2006.01) |
| C04B 24/42 | (2006.01) |
| C04B 38/10 | (2006.01) |
| C04B 103/20 | (2006.01) |
| C04B 103/30 | (2006.01) |
| C04B 103/40 | (2006.01) |
| C04B 103/42 | (2006.01) |
| C04B 111/00 | (2006.01) |
| C04B 111/60 | (2006.01) |

(52) U.S. Cl.
CPC ............ C04B 28/14 (2013.01); C04B 18/167 (2013.01); C04B 24/16 (2013.01); C04B 24/42 (2013.01); C04B 38/10 (2013.01); C04B 2103/20 (2013.01); C04B 2103/30 (2013.01); C04B 2103/40 (2013.01); C04B 2103/42 (2013.01); C04B 2111/0062 (2013.01); C04B 2111/00637 (2013.01); C04B 2111/00681 (2013.01); C04B 2111/60 (2013.01)

(58) Field of Classification Search
CPC ....... C04B 18/167; C04B 24/08; C04B 24/16; C04B 24/42; C04B 28/14; C04B 38/10; C04B 2103/20; C04B 2103/30; C04B 2103/40; C04B 2103/42; C04B 2111/0062; C04B 2111/00637; C04B 2111/00681; C04B 2111/60; Y02W 30/91
See application file for complete search history.

(56) References Cited

U.S. PATENT DOCUMENTS

| | | |
|---|---|---|
| 3,926,650 A | 12/1975 | Lange et al. |
| 6,039,800 A | 3/2000 | Islam |
| 2009/0110946 A1 | 4/2009 | Martin et al. |
| 2015/0368164 A1 | 12/2015 | Gehrig et al. |
| 2016/0236978 A1 | 8/2016 | Piwowarski |
| 2017/0283741 A1 | 10/2017 | Behler et al. |

FOREIGN PATENT DOCUMENTS

| | | |
|---|---|---|
| CN | 1091735 A | 9/1994 |
| CN | 1192725 A | 9/1998 |
| CN | 104602802 A | 5/2015 |
| CN | 105555494 A | 5/2016 |
| CN | 106470959 A | 3/2017 |
| CN | 106659658 A | 5/2017 |
| DE | 43 00 660 A1 | 7/1994 |
| DE | 699 13 951 T2 | 8/2004 |
| EP | 2 796 436 A1 | 10/2014 |
| EP | 2 990 026 A1 | 3/2016 |
| JP | 49-069751 | 7/1974 |
| JP | 57-027961 | 2/1982 |
| JP | 58-060654 A | 4/1983 |
| JP | 02-296780 A | 12/1990 |
| WO | 99/50200 A1 | 10/1999 |
| WO | WO 99/58466 A1 | 11/1999 |
| WO | WO 2015/051822 A1 | 4/2015 |
| WO | 2015/200156 A1 | 12/2015 |

OTHER PUBLICATIONS

International Search Report dated Nov. 19, 2018 in PCT/EP2018/078575 filed Oct. 18, 2018, citing documents AA-AD and AO-AT therein, 3 pages.

*Primary Examiner* — Anthony J Green
(74) *Attorney, Agent, or Firm* — Faegre Drinker Biddle & Reath LLP

(57) ABSTRACT

The present invention relates to a gypsum composition comprising recycled gypsum and a foam former comprising at least one alpha-sulfo fatty acid disalt, to a process for production thereof and to an article comprising the gypsum composition of the invention. The present invention further relates to the use of a foam former comprising at least one alpha-sulfo fatty acid disalt for reducing the wet density of an aqueous gypsum composition having a recycled gypsum content of at least 0.5% by weight.

20 Claims, No Drawings

DISALT AS ROBUST PRIMARY SURFACTANT FOR CALCIUM SULFATE MIXTURES CONTAINING RECYCLED GYPSUM

The present invention relates to a gypsum composition comprising recycled gypsum and a foam former comprising at least one alpha-sulfo fatty acid disalt, to a process for production thereof and to an article comprising the gypsum composition of the invention. The present invention further relates to the use of a foam former comprising at least one alpha-sulfo fatty acid disalt for reducing the wet density of an aqueous gypsum composition having a recycled gypsum content of at least 0.5% by weight.

In the construction industry, many kinds of different gypsum-containing building materials are used. The gypsum-containing building materials include gypsums such as stucco gypsums, mortar gypsums, machine gypsum plasters, plastering gypsums, bonding gypsums, jointing gypsums, filling gypsums, insulating gypsums, flooring gypsums, ready-mixed plaster gypsums and imitation marbles. The gypsum-containing building materials also include gypsum-containing ready-made structural components, such as gypsum plasterboard panels, gypsum fiberboard panels, gypsum-containing wallboard panels, fleece-lined gypsum boards, and gypsum-containing moldings.

In the gypsum industry, manufacturers have a duty to integrate recycled gypsum material back into the production process. This is understood to mean gypsum-containing construction and demolition wastes, especially gypsum boards (gypsum plasterboard panels, gypsum fiberboard panels, all-gypsum panels). Gypsum panel wastes are obtained, for example, as offcut material in gypsum plasterboard panel production or in the new construction of buildings and renovation and demolition work.

However, a problem in the utilization of recycled gypsum is that the quality of the material is very variable owing to the additives present in the gypsum panel wastes. For example, hydrophobized gypsum plasterboard panels which are used for wetroom finishing contain proportions of siloxanes which have a very significant defoaming effect. In the production of gypsum plasterboard panels, pregenerated foam is added to the gypsum slurry in order to reduce the density of the product. Therefore, the presence of siloxane-containing recycled gypsum in the production of gypsum plasterboard panels is often highly disadvantageous owing to the defoaming effect.

There is therefore a need for gypsum compositions which can be foamed effectively irrespective of the amount and quality of recycled gypsum material present.

It was accordingly an object of the present invention to provide a gypsum composition to which recycled gypsum can be added without impairing the foam efficiency.

This object was achieved by an aqueous gypsum composition comprising
i) at least 40.0% by weight of gypsum, and
ii) at least 0.002% by weight, preferably at least 0.005% by weight, of a foam former comprising at least one alpha-sulfo fatty acid disalt, based on the total weight of the gypsum composition,
where the gypsum has a recycled gypsum content of at least 0.5% by weight, based on the total gypsum content in the gypsum composition.

It has been found here that, surprisingly, disalt surfactant structures in particular, especially alpha-sulfo fatty acid disalts, are robust toward siloxane-containing materials, which greatly reduces the foam-destroying effect of the siloxanes. Irrespective of the recycled gypsum content, the foam yield in the case of use of foams based on alpha-sulfo fatty acid disalts in gypsum panel production is virtually constant.

Thus, in a preferred embodiment of the present invention, the recycled gypsum content is siloxane-containing recycled gypsum.

In a further preferred embodiment of the present invention, the at least one alpha-sulfo fatty acid disalt is a compound of the formula (I)

$$R^1CH(SO_3M^1)COOM^2 \qquad (I)$$

where $R^1$ is a linear or branched alkyl or alkylene radical having 6 to 16 carbon atoms and $M^1$ and $M^2$ are independently H, Li, Na, K, Ca/2, Mg/2, ammonium or alkanolamine.

Preferably, $R^1$ is a linear alkyl radical having 8 to 16 carbon atoms.

More preferably, $M^1$ and $M^2$ are Na.

In a further embodiment of the present invention, the composition further comprises at least 0.005% by weight, preferably at least 0.002% by weight, of at least one cosurfactant other than alpha-sulfo fatty acid disalts.

More preferably, the at least one cosurfactant is selected from the group consisting of alkyl polyglycosides, alkylamido betaines, glutamates, sulfo ketones, sulfates (including alkyl sulfates, alkyl ether sulfates), isethionates, N-acylamino acid compounds, sulfoacetates, sulfonates, sulfosuccinates, taurates, betaines, amphosurfactants, alkanolamides, amine oxides, carboxylates, alkyl ethoxylates, cationic surfactants, cationic polymers, protein hydrolyzates, silicones, fatty alcohols, protein derivatives, bleaches of disalts, nonionic surfactants and mixtures of these.

In a further embodiment of the present invention, the composition further comprises at least one solvent.

In a further preferred embodiment of the present invention, the composition comprises one or more additives selected from the group consisting of cellulose ethers, slaked lime, starch, modified starch, hydrophobizing agents, mineral additives, low-density aggregates, fibers, accelerators, thickeners, retardants, air pore formers, foaming agents, swelling agents, fillers, polyacrylates, dispersants, plasticizers, superabsorbents and stabilizers.

In a preferred embodiment of the present invention, the gypsum composition further comprising 0.0001% to 1.0% by weight of a retardant and/or 0.01% to 2.0% by weight of a plasticizer.

The present invention also relates to an article comprising the above-described gypsum composition.

It is especially preferable that the article comprises stucco gypsums, mortar gypsums, machine gypsum plasters, plastering gypsums, bonding gypsums, jointing gypsums, filling gypsums, insulating gypsums, flooring gypsums, ready-mixed plaster gypsums, imitation marbles or gypsum-containing ready-made structural components such as gypsum plasterboard panels, gypsum fiberboard panels, gypsum-containing wallboard panels, fleece-lined gypsum panels, and gypsum-containing moldings.

The present invention further relates to a process for producing an aqueous gypsum composition, comprising
a) providing a foam composed of a foam former comprising at least one alpha-sulfo fatty acid disalt,
b) providing a composition comprising water, gypsum and optionally additives,
c) allowing shear forces to act on the composition obtained in step b) with addition of the foam from step a), wherein the gypsum has a recycled gypsum content of at least 0.5% by weight, based on the total gypsum content in the composition.

The present invention also relates to the use of a foam former comprising at least one alpha-sulfo fatty acid disalt for reducing the wet density of an aqueous gypsum composition having a recycled gypsum content of at least 0.5% by weight, based on the total gypsum content in the composition.

It is especially preferable that the at least one alpha-sulfo fatty acid disalt is one of the abovementioned compounds.

The present invention is described in detail hereinafter.

As elucidated above, the composition of the invention comprises gypsum having a recycled gypsum content of at least 0.5% by weight.

In the context of the present invention, the term "gypsum" relates to the compound calcium sulfate in its anhydrous or hydrated form, for example gypsum rock, consisting of this compound in crystalline form, and the corresponding building material such as calcium sulfate hemihydrate, dihydrate or anhydrite of the formula $CaSO_4 \cdot x\, H_2O$ where x is 0, ½ or 2, or mixtures of these.

The gypsum composition of the invention comprises at least 40.0% by weight, more preferably 45.0% to 70.0% by weight, especially preferably 50.0% to 65.0% by weight, of gypsum, based on the total weight of the gypsum composition.

The recycled gypsum content of the gypsum used in accordance with the invention is at least 0.5% by weight, more preferably at least 2.0% by weight, especially preferably at least 5.0% by weight, based on the total gypsum content in the composition.

In the context of the present invention, the term "recycled gypsum" relates to gypsum that has already been used in the production of gypsum-containing articles and has been recovered from said articles. Examples of gypsum-containing articles from which recycled gypsum is obtained are stucco gypsums, mortar gypsums, machine gypsum plasters, plastering gypsums, bonding gypsums, jointing gypsums, filling gypsums, insulating gypsums, flooring gypsums, ready-mixed plaster gypsums, imitation marbles and gypsum-containing ready-made structural components such as gypsum plasterboard panels, gypsum fiberboard panels, gypsum-containing wallboard panels, fleece-lined gypsum panels, and gypsum-containing moldings.

Recycled gypsum generally comprises the additives present in the gypsum-containing articles that are integrated into the production process. For example, hydrophobized gypsum plasterboard panels that are used for wetroom finishing include siloxanes or wax emulsions.

The recycled gypsum according to the present invention preferably comprises siloxanes. Siloxanes are linear or cyclic compounds of the formula

where $R^1$ is hydrogen or an alkyl radical and $R^2$, if present, is a —O— group that forms a ring closure between the terminal $R^1{}_{2-3}R^2{}_{0-1}Si$— and —$SiR^1{}_{2-3}$ groups and n can have values of 0 to 100. If R is an alkyl radical, it is preferably a linear or branched $C_1$-$C_{10}$-alkyl radical. Preferably, $R^1$ is methyl, ethyl, n-propyl, n-butyl, isobutyl or n-hexyl. More preferably, $R^1$ is methyl.

In particular, the recycled gypsum contains at least 0.01 siloxanes, more preferably 0.02% to 5.0% by weight of siloxanes, especially preferably 0.05% to 2.0% by weight, based on the total weight of the recycled gypsum.

Accordingly, the gypsum composition of the invention comprises at least 0.01% by weight of siloxanes, more preferably 0.01% to 2.0% by weight of siloxanes, especially preferably 0.02% to 1.0% by weight, based on the total weight of the gypsum composition.

In addition, the gypsum composition of the invention comprises at least 0.005% by weight of a foam former comprising at least one alpha-sulfo fatty acid disalt, or at least 0.007% by weight, or at least 0.01% by weight, based on the total weight of the gypsum composition.

In a further embodiment, the gypsum composition of the invention comprises at least 0.002% by weight of a foam former comprising at least one alpha-sulfo fatty acid disalt, more preferably at least 0.003% by weight, especially preferably at least 0.005% by weight, based on the total weight of the gypsum composition.

In one embodiment, the foam former comprises at least 30% by weight, at least 45% by weight, or at least 60% by weight of the at least one alpha-sulfo fatty acid disalt, based on the total weight of the foam former. More preferably, the foam former consists of the at least one alpha-sulfo fatty acid disalt.

Preferably, the foam former comprises at least 15% by weight, more preferably at least 25% by weight, especially preferably at least 30% by weight, of the at least one alpha-sulfo fatty acid disalt, based on the total weight of the foam former. More preferably, the foam former consists of the at least one alpha-sulfo fatty acid disalt.

In the context of the present invention, the term "foam former" relates to interface-active substances that have a certain film-forming capacity and hence promote the generation of foam in liquids.

Preferably, the at least one alpha-sulfo fatty acid disalt is a compound of the formula (I)

$$R^1CH(SO_3M^1)COOM^2 \quad (I)$$

where $R^1$ is a linear or branched alkyl or alkylene radical having 6 to 16 carbon atoms and $M^1$ and $M^2$ are independently H, Li, Na, K, Ca/2, Mg/2, ammonium or alkanolamine. Particularly preferred alkanolamines here are monoethanolamine, diethanolamine, triethanolamine and monoisopropanolamine.

A further proviso applicable is that the proportion of the compounds of the formula (I) in the at least one alpha-sulfo fatty acid disalt in which the $R^1$ radical is an alkylene radical is 3% by weight or less, based on the total weight of the at least one alpha-sulfo fatty acid salt.

Preferably, $R^1$ is a saturated linear alkyl radical having 8 to 16 carbon atoms, more preferably 9 to 16 carbon atoms, especially preferably 10 to 12 carbon atoms.

More preferably, the proviso is applicable that the proportion of the compounds of the formula (I) in the at least one alpha-sulfo fatty acid disalt in which the $R^1$ radical is a decyl and/or dodecyl radical is 90% by weight or more, based on the total weight of the at least one alpha-sulfo fatty acid salt.

More preferably, $M^1$ and $M^2$ are Na.

Accordingly, the at least one alpha-sulfo fatty acid disalt according to the present invention is especially preferably the disodium salt of 2-sulfododecanoic acid, the disodium salt of 2-sulfotetradecanoic acid or mixtures of these. More preferably, the at least one alpha-sulfo fatty acid disalt is a mixture of the disodium salt of 2-sulfododecanoic acid and the disodium salt of 2-sulfotetradecanoic acid.

The compounds of the formula (I) can be prepared by any relevant methods known to those skilled in the art. An especially preferred method of preparation is the sulfonation of the corresponding carboxylic acids. This involves reacting the corresponding carboxylic acid, especially the corresponding fatty acid, with gaseous sulfur trioxide, using the sulfur trioxide preferably in such an amount that the molar ratio of $SO_3$ to fatty acid is in the range from 1.0:1 to 1.1:1. The crude products thus obtained, which are acidic sulfonation products, are then partially or fully neutralized, preference being given to full neutralization with aqueous NaOH. If desired, it is also possible to undertake purification steps.

In a further preferred embodiment, the gypsum composition of the invention comprises at least 0.002% by weight of at least one cosurfactant, more preferably at least 0.003% by weight, especially preferably at least 0.005% by weight, based on the total weight of the gypsum composition.

The at least one cosurfactant is at least one foam former other than alpha-sulfo fatty acid disalts.

Preferably, the at least one cosurfactant is a foam former selected from the group consisting of alkyl polyglycosides, alkylamido betaines, glutamates, sulfo ketones, sulfates (including alkyl sulfates, alkyl ether sulfates), isethionates, N-acylamino acid compounds, sulfoacetates, sulfonates, sulfosuccinates, taurates, betaines, amphosurfactants, alkanolamides, amine oxides, carboxylates, alkyl ethoxylates, cationic surfactants, cationic polymers, protein hydrolyzates, silicones, fatty alcohols, protein derivatives, bleaches of disalts, nonionic surfactants and mixtures of these.

Preferred alkyl polyglycosides are compounds of the formula (II)

$$R^2\text{—}O\text{-}[G]_p \qquad (II)$$

where $R^2$ is a linear or branched alkyl and/or alkylene radical having 8 to 18 carbon atoms, G is a sugar residue having 5 or 6 carbon atoms and p is numbers from 1 to 10.

Preferred alkylamido betaines are compounds of the formula (III)

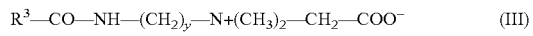

$$R^3\text{—}CO\text{—}NH\text{—}(CH_2)_y\text{—}N^+(CH_3)_2\text{—}CH_2\text{—}COO^- \qquad (III)$$

where $R^3$ is a linear or branched alkyl or alkylene radical having 7 to 19 carbon atoms and y is an integer in the range of 2 to 4.

The preferred N-acylamino acid compounds are preferably N-acylglutamic acid compounds of the formula (IV)

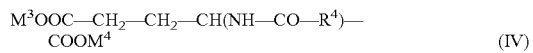

$$M^3OOC\text{—}CH_2\text{—}CH_2\text{—}CH(NH\text{—}CO\text{—}R^4)\text{—}COOM^4 \qquad (IV)$$

where $R^4$ is a linear or branched alkyl or alkylene radical having 7 to 19 carbon atoms and the $M^3$ and $M^4$ radicals are independently selected from the group consisting of H, Li, Na, K, Ca/2, Mg/2, ammonium and alkanolamines.

In a further embodiment of the present invention, the composition further comprises at least one solvent. The composition preferably comprises 0.0001% by weight to 0.2% by weight of the at least one solvent, based on the total weight of the gypsum composition.

The solvent is preferably selected from the group consisting of hexylene glycol, (2-methyl-pentane-2,4-diol), ethanol, propanal, n-propyl alcohol, 1-pentanol, 2-pentanol, 3-pentanol, 2-methyl-1-butanol, 2-methyl-2-butanol, 3-methyl-1-butanol, 3-methyl-2-butanol, 2,2-dimethyl-1-propanol, n-propyl acetate, n-butyl acetate, 1-pentyl acetate, 2-pentyl acetate, 3-pentyl acetate, isopentyl acetate, 1,1-dimethylpropyl acetate, 2-methylbutyl acetate, 2-ethylhexyl acetate, 2-butoxyethanol, 2-(2-butoxyethoxy)ethanol, triethylene glycol monobutyl ether, 3,6,9,12-tetraoxahexadecan-1-ol, 2-hexoxy-1-ethanol, 2-(2-hexyloxyethoxy)ethanol, 1-methoxy-2-propanol, methoxypropoxypropanol, 1-butoxy-2-propanol, di(propylene glycol) butyl ether, tri(propylene glycol) butyl ether, 2-butoxyethyl acetate, 2-(2-butoxyethoxy)ethyl acetate, 1-methoxy-2-propyl acetate and mixtures thereof.

The gypsum composition of the invention may comprise the foam former in unfoamed form or in the form of a prepared foam. Processes for producing prepared foam are known to those skilled in the art.

The prepared foam preferably has a foam density of 50 to 180 g/L, more preferably 60 to 140 g/L, especially preferably 70 to 120 g/L.

The gypsum composition of the invention preferably comprises at least 40.0% by weight, more preferably 45.0% to 75.0% by weight, especially preferably 50.0% to 65.0% by weight, of gypsum, at least 0.005% by weight, more preferably at least 0.007% by weight, especially preferably at least 0.01% by weight, of the foam former comprising at least one alpha-sulfo fatty acid disalt, optionally at least 0.002% by weight, more preferably at least 0.003% by weight, especially preferably at least 0.005% by weight, of the at least one cosurfactant, optionally at least 0.0001% by weight, preferably from 0.0005% by weight to 0.2% by weight, of at least one solvent and 20.0% to 65.0% by weight, more preferably 30.0% to 55.0% by weight, especially preferably 35.0% to 50.0% by weight, of water, based on the total weight of the gypsum composition.

In a further embodiment, the gypsum composition of the invention preferably comprises at least 40.0% by weight, more preferably 45.0% to 75.0% by weight, especially preferably 50.0% to 65.0% by weight, of gypsum, at least 0.002% by weight, more preferably at least 0.003% by weight, especially preferably at least 0.005% by weight, of the foam former comprising at least one alpha-sulfo fatty acid disalt, optionally at least 0.001% by weight, more preferably at least 0.002% by weight, especially preferably at least 0.003% by weight, of the at least one cosurfactant, optionally at least 0.0001% by weight, preferably from 0.0005% by weight to 0.2% by weight, of at least one solvent and 20.0% to 65.0% by weight, more preferably 30.0% to 55.0% by weight, especially preferably 35.0% to 50.0% by weight, of water, based on the total weight of the gypsum composition.

Accordingly, the gypsum composition of the invention preferably has a water/gypsum value of 0.3 to 1.5, more preferably of 0.5 to 1.0, especially preferably of 0.7 to 0.8.

In addition, the gypsum composition of the invention can be modified by the addition of additives. Typically, a gypsum composition comprises additives that affect the flow characteristics or the setting process. For example, the gypsum composition of the invention may comprise one or more additives selected from the group consisting of cellulose ethers, slaked lime, mineral additives, low-density aggregates, fibers, accelerators, thickeners, retardants, air pore formers, foaming agents, swelling agents, fillers, polyacrylates, dispersants, plasticizers, superabsorbents and stabilizers.

Accordingly, the gypsum composition of the invention comprises, more preferably consists of, at least 40.0% by weight, more preferably 45.0% to 70.0% by weight, especially preferably 50.0% to 65.0% by weight, of gypsum, at least 0.005% by weight, more preferably at least 0.007% by weight, especially preferably at least 0.01% by weight, of the foam former comprising at least one alpha-sulfo fatty acid disalt, optionally at least 0.002% by weight, more preferably at least 0.003% by weight, especially preferably at least 0.005% by weight, of the at least one cosurfactant, optionally at least 0.0001% by weight, preferably from 0.0005% by weight to 0.2% by weight, of at least one solvent, 20.0% to 65.0% by weight, more preferably 30.0% to 55.0% by weight, especially preferably 35.0% to 50.0% by weight, of water and 0.0% to 5.0% by weight, more preferably 0.0001% to 3.0% by weight, especially preferably 0.001% to 1.0% by weight, of additives, based on the total weight of the gypsum composition.

In a preferred embodiment, the gypsum composition of the invention comprises, more preferably consists of, at least 40.0% by weight, more preferably 45.0% to 70.0% by weight, especially preferably 50.0% to 65.0% by weight, of gypsum, at least 0.002% by weight, more preferably at least 0.003% by weight, especially preferably at least 0.005% by weight, of the foam former comprising at least one alpha-sulfo fatty acid disalt, optionally at least 0.001% by weight, more preferably at least 0.002% by weight, especially preferably at least 0.003% by weight, of the at least one cosurfactant, optionally at least 0.0001% by weight, preferably from 0.0005% by weight to 0.2% by weight, of at least one solvent, 20.0% to 65.0% by weight, more preferably 30.0% to 55.0% by weight, especially preferably 35.0% to 50.0% by weight, of water and 0.0% to 5.0% by weight, more preferably 0.0001% to 3.0% by weight, especially preferably 0.001% to 1.0% by weight, of additives, based on the total weight of the gypsum composition.

Preferably, the gypsum composition of the invention may comprise retardants, accelerators and/or plasticizers.

In the context of the present invention, the term "retardant" relates to an additive that slows the setting process of a gypsum composition. Nonlimiting examples of retardants are tartaric acid, citric acid and salts thereof, gluconates, protein hydrolyzate, polycondensed amino acid, phosphates, complexing agents, hydroxycarboxylic acids, saccharides, organophosphates, and mixtures of these.

In the context of the present invention, the term "accelerator" relates to an additive which accelerates the setting process of a gypsum composition. Nonlimiting examples of accelerators are $K_2SO_4$ and finely ground dihydrate.

In the context of the present invention, the term "plasticizer" relates to an additive that affects the flow characteristics of a gypsum composition. Suitable plasticizers for the gypsum composition of the invention are plasticizers based on naphthalenesulfonate, melaminesulfonate, lignosulfonate, ketone resins, polyaryl ethers and polycarboxylate ethers.

More preferably, the gypsum composition of the invention comprises 0.0001% to 1.0% by weight of a retardant and/or 0.01% to 2.0% by weight of a plasticizer.

Accordingly, the gypsum composition of the invention comprises, more preferably consists of, at least 40.0% by weight, more preferably 45.0% to 70.0% by weight, especially preferably 50.0% to 65.0% by weight, of gypsum, at least 0.005% by weight, more preferably at least 0.007% by weight, especially preferably at least 0.01% by weight, of the foam former comprising at least one alpha-sulfo fatty acid disalt, optionally at least 0.002% by weight, more preferably at least 0.003% by weight, especially preferably at least 0.005% by weight, of the at least one cosurfactant, optionally at least 0.0001% by weight, preferably from 0.0005% by weight to 0.2% by weight, of at least one solvent and 20.0% to 65.0% by weight, more preferably 30.0% to 55.0% by weight, especially preferably 35.0% to 50.0% by weight, of water, 0.0001% to 1.0% by weight of a retardant and 0.01% to 2.0% by weight of a plasticizer and 0.0% to 5.0% by weight, more preferably 0.0001% to 3.0% by weight, especially preferably 0.001% to 1.0% by weight, of additives, based on the total weight of the gypsum composition.

In a preferred embodiment, the gypsum composition of the invention comprises, more preferably consists of, at least 40.0% by weight, more preferably 45.0% to 70.0% by weight, especially preferably 50.0% to 65.0% by weight, of gypsum, at least 0.002% by weight, more preferably at least 0.003% by weight, especially preferably at least 0.005% by weight, of the foam former comprising at least one alpha-sulfo fatty acid disalt, optionally at least 0.001% by weight, more preferably at least 0.002% by weight, especially preferably at least 0.003% by weight, of the at least one cosurfactant, optionally at least 0.0001% by weight, preferably from 0.0005% by weight to 0.2% by weight, of at least one solvent and 20.0% to 65.0% by weight, more preferably 30.0% to 55.0% by weight, especially preferably 35.0% to 50.0% by weight, of water, 0.0001% to 1.0% by weight of a retardant and 0.01% to 2.0% by weight of a plasticizer and 0.0% to 5.0% by weight, more preferably 0.0001% to 3.0% by weight, especially preferably 0.001% to 1.0% by weight, of additives, based on the total weight of the gypsum composition.

The wet density of the gypsum composition of the invention is preferably less than 1400 $kg/m^3$, more preferably less than 1250 $kg/m^3$, especially preferably less than 1100 $kg/m^3$.

The present invention further relates to an article comprising the gypsum composition of the invention.

The article preferably comprises at least 80% by weight, more preferably at least 90% by weight, especially preferably at least 95% by weight, of the gypsum composition of the invention.

In a preferred embodiment of the present invention, the article consists of the gypsum composition of the invention.

Said article preferably comprises stucco gypsums, mortar gypsums, machine gypsum plasters, plastering gypsums, bonding gypsums, jointing gypsums, filling gypsums, insulating gypsums, flooring gypsums, ready-mixed plaster gypsums, imitation marbles and gypsum-containing ready-made structural components such as gypsum plasterboard panels, gypsum fiberboard panels, gypsum-containing wallboard panels, fleece-lined gypsum panels, and gypsum-containing moldings.

More preferably, the article is a gypsum plasterboard panel.

The present invention further relates to a process for producing an aqueous gypsum composition comprising
a) providing a foam composed of a foam former comprising at least one alpha-sulfo fatty acid disalt,
b) providing a composition comprising water, gypsum and optionally additives,
c) allowing shear forces to act on the composition obtained in step b) with addition of the foam from step a),
wherein the gypsum has a recycled gypsum content of at least 0.5% by weight, based on the total gypsum content in the composition.

In step a) of the process of the invention, a prepared foam is provided from a foam former comprising at least one alpha-sulfo fatty acid disalt in order to reduce the weight of the gypsum article. The foam is produced from a mixture comprising foam former, air and water with the aid of a suitable foam generator. Processes for producing a foam for a gypsum composition are known to those skilled in the art.

Preferably, the mixture from which the foam is produced further comprises at least one solvent. Preferably, the mixture from which the foam is produced comprises 0.5% by weight to 30.0% by weight of the at least one solvent, based on the total weight of the foam.

The solvent is preferably selected from the group consisting of hexylene glycol, (2-methyl-pentane-2,4-diol), ethanol, propanal, n-propyl alcohol, 1-pentanol, 2-pentanol, 3-pentanol, 2-methyl-1-butanol, 2-methyl-2-butanol, 3-methyl-1-butanol, 3-methyl-2-butanol, 2,2-dimethyl-1-propanol, n-propyl acetate, n-butyl acetate, 1-pentyl acetate, 2-pentyl acetate, 3-pentyl acetate, isopentyl acetate, 1,1-dimethylpropyl acetate, 2-methylbutyl acetate, 2-ethylhexyl acetate, 2-butoxyethanol, 2-(2-butoxyethoxy)ethanol, triethylene glycol monobutyl ether, 3,6,9,12-tetraoxahexadecan-1-ol, 2-hexoxy-1-ethanol, 2-(2-hexyloxyethoxy)ethanol, 1-methoxy-2-propanol, methoxypropoxypropanol, 1-butoxy-2-propanol, di(propylene glycol) butyl ether, tri(propylene glycol) butyl ether, 2-butoxyethyl acetate, 2-(2-butoxyethoxy)ethyl acetate, 1-methoxy-2-propyl acetate and mixtures thereof.

The foam former comprising at least one alpha-sulfo fatty acid disalt is preferably at least one of the abovementioned compounds.

In step b), a composition comprising water, gypsum and optionally one or more of the abovementioned additives is provided. The gypsum comprises a recycled gypsum content of at least 0.5% by weight, more preferably at least 2.0% by weight, especially preferably at least 5.0% by weight, based on the total gypsum content in the composition.

Said recycled gypsum is preferably siloxane-containing recycled gypsum as described above.

By the action of shear forces on the composition obtained in step b) with addition of the foam from step a), the gypsum composition of the invention is obtained.

The present invention also relates to the use of a foam former comprising at least one alpha-sulfo fatty acid disalt for reducing the wet density of an aqueous gypsum composition having a recycled gypsum content of at least 0.5% by weight, based on the total gypsum content in the composition.

It is especially preferable that the at least one alpha-sulfo fatty acid disalt is one of the abovementioned compounds.

The examples which follow are intended to further illustrate the invention.

EXAMPLES

1) Methods
Wet Density
To determine the wet density of the gypsum compositions, the ratio between weight and volume was determined by introducing the respective composition into a beaker of known volume and then weighing.
Foam Density
To determine the foam density, the ratio between weight and volume was determined by introducing the respective foam into a beaker of known volume and then weighing.
2) Production of Recycled Gypsum
For production of a gypsum slurry, 300 g of beta-hemihydrate (obtained from flue gas desulfurization) were introduced into 201.0 g of water containing 3.0 g of siloxane (Silres BS 94, from Wacker Chemie) and left to soak for 15 seconds. Subsequently, the mixture was sheared at 285 rpm for 30 seconds and poured into a mold. After 15 minutes, the sample was taken from the mold and subjected to thermal treatment at 150° C. in a saturated steam atmosphere for one hour. Thereafter, the samples were stored at 40° C. until constant mass was attained.

For further processing, the samples were ground with a ball mill to a $d_{50}$ of about 10 µm and then calcined at 150° C. for 5 hours. After cooling to room temperature, the recycled gypsum was usable for the application tests.

3) Compositions Based on Fatty Alkyl Ether Sulfate Surfactants

First of all, a foam based on fatty alkyl ether sulfate was produced.

For this purpose, a 0.40% surfactant solution (Vinapor GYP 2680, BASF) was converted to foam by means of a foam generator based on a rotor/stator system with addition of compressed air. The foam density established was 75 g/L.

Reference Mixture R1

For production of the gypsum slurry, 350 g of beta-hemihydrate (obtained from flue gas desulfurization) were homogenized with 0.035 g of retardant (Plastretard) and 3.3 g of finely ground dihydrate and then introduced into 234.2 g of water that contained 1.05 g of beta-naphthalene plasticizer and left to soak for 15 seconds. Subsequently, the mixture was sheared at 1600 rpm for 30 seconds. During that time, the fatty alkyl ether sulfate-based foam (18.2 g with a density of 75 g/L) was added. The resulting fresh density of reference mixture 1 was 1050 kg/m³.

Reference Mixture R2

Reference mixture R2 was produced analogously to reference mixture R1, except that 5% beta-hemihydrate was replaced by siloxane-containing recycled gypsum. The wet density of reference mixture R2 rose to 1380 kg/m³.

4) Compositions Based on Alpha-Sulfo Fatty Acid Disalt Surfactants

First of all, a foam based on an alpha-sulfo fatty acid disalt was produced.

For this purpose, a 0.40% surfactant solution based on C12/14-alpha-sulfo fatty acid Na disalt was converted to foam by means of a foam generator based on a rotor/stator system with addition of compressed air. The foam density established was 75 g/L.

Reference mixture R3 For production of the gypsum slurry, 350 g of beta-hemihydrate (obtained from flue gas desulfurization) were homogenized with 0.035 g of retardant (Plastretard) and 3.3 g of finely ground dihydrate and then introduced into 234.2 g of water that contained 1.05 g of beta-naphthalene plasticizer and left to soak for 15 seconds. Subsequently, the mixture was sheared at 1600 rpm for 30 seconds. During that time, the alpha-sulfo fatty acid disalt-based foam (18.2 g with a density of 75 g/L) was added. The resulting fresh density of reference mixture 1 was 1110 kg/m³.

Example E1 (Inventive)

Example E1 was produced analogously to reference mixture R3 except that 5% beta-hemihydrate was replaced by siloxane-containing recycled gypsum. The wet density of the inventive example rose to only 1170 kg/m³.

The compositions and properties of the reference mixtures and of the inventive example are collated in table 1.

TABLE 1

Composition and properties of the gypsum compositions

| | | R1 | R2 | R3 | E1 |
|---|---|---|---|---|---|
| Beta-hemihydrate | [g] | 350.0 | 346.5 | 350.0 | 346.5 |
| Recycled gypsum | [g] | | 3.5 | | 3.5 |
| Finely ground | [g] | 3.3 | 3.3 | 3.3 | 3.3 |

TABLE 1-continued

Composition and properties of the gypsum compositions

|  |  | R1 | R2 | R3 | E1 |
|---|---|---|---|---|---|
| dihydrate |  |  |  |  |  |
| Wet density | [kg/m$^3$] | 1050 | 1380 | 1110 | 1170 |
| Rise in wet density | [%] | — | 31.4 | — | 5.4 |

The results show that the recycled gypsum-containing compositions have an only slightly higher wet density using alpha-sulfo fatty acid disalt-based foams than the reference mixtures that do not contain any recycled gypsum, whereas a distinct rise in wet density is observed for recycled gypsum-containing compositions with fatty alkyl ether sulfate-based foams.

The invention claimed is:

1. An aqueous gypsum composition, comprising:
   at least 40.0% by weight of gypsum, and
   at least 0.002% by weight of a foam former comprising at least one alpha-sulfo fatty acid disalt, each weight percentage based on the total weight of the aqueous gypsum composition, and
   wherein the gypsum has a recycled gypsum content of at least 0.5% by weight, based on the total weight of gypsum.

2. The aqueous gypsum composition of claim 1, wherein the recycled gypsum is comprises siloxane.

3. The aqueous gypsum composition of claim 1, wherein the at least one alpha-sulfo fatty acid disalt is a compound of formula (I):

$$R^1CH(SO_3M^1)COOM^2 \quad (I),$$

wherein R$^1$ is a linear or branched alkyl or alkylene radical having 6 to 16 carbon atoms, and
   wherein M$^1$ and M$^2$ are each independently selected from the group consisting of H, Li, Na, K, Ca, Mg, ammonium, and alkanolamine.

4. The aqueous gypsum composition of claim 3, wherein R$^1$ is a saturated linear alkyl radical having 8 to 16 carbon atoms.

5. The aqueous gypsum composition of claim 3, where wherein M$^1$ and M$^2$ are Na.

6. The aqueous gypsum composition of claim 1, further comprising at least 0.001% by weight of at least one cosurfactant other than an alpha-sulfo fatty acid disalt, relative to the total weight of the aqueous gypsum composition.

7. The aqueous gypsum composition of claim 6, wherein the at least one cosurfactant is at least one selected from the group consisting of alkyl polyglycosides, alkylamido betaines, glutamates, sulfo ketones, sulfates, isethionates, N-acylamino acid compounds, sulfoacetates, sulfonates, sulfosuccinates, taurates, betaines, amphosurfactants, alkanolamides, amine oxides, carboxylates, alkyl ethoxylates, cationic surfactants, cationic polymers, protein hydrolyzates, silicones, fatty alcohols, protein derivatives, bleaches of disalts, and nonionic surfactants.

8. The aqueous gypsum composition of claim 1, further comprising at least one solvent.

9. The aqueous gypsum composition of claim 1, further comprising one or more additives selected from the group consisting of cellulose ethers, slaked lime, starch, modified starch, hydrophobizing agents, mineral additives, low-density aggregates, fibers, accelerators, thickeners, retardants, air pore formers, foaming agents, swelling agents, fillers, polyacrylates, dispersants, plasticizers, superabsorbents, and stabilizers.

10. The aqueous gypsum composition of claim 1, further comprising 0.0001% to 1.0% by weight of a retardant and/or 0.01% to 2.0% by weight of a plasticizer, each weight percentage relative to the total weight of the aqueous gypsum composition.

11. An article comprising the aqueous gypsum composition of claim 1.

12. The article of claim 11, further comprising at least one selected from the group consisting of stucco gypsums, mortar gypsums, machine gypsum plasters, plastering gypsums, bonding gypsums, jointing gypsums, filling gypsums, insulating gypsums, flooring gypsums, ready-mixed plaster gypsums, imitation marbles, gypsum-containing ready-made structural components, gypsum plasterboard panels, gypsum fiberboard panels, gypsum-containing wallboard panels, fleece-lined gypsum panels, and gypsum-containing moldings.

13. A process for producing an aqueous gypsum composition, comprising:
   providing a foam comprising a foam former, the foam former comprising at least one alpha-sulfo fatty acid disalt;
   providing a composition comprising water and gypsum, and optionally comprising additives; and
   allowing shear forces to act on the composition with addition of the foam;
   wherein the gypsum has a recycled gypsum content of at least 0.5% by weight, based on the total weight of gypsum.

14. A method of using a foam former comprising at least one alpha-sulfo fatty acid disalt, the method comprising:
   reducing the wet density of an aqueous gypsum composition,
   wherein the aqueous gypsum composition has a recycled gypsum content of at least 0.5% by weight, based on the total weight of gypsum.

15. The method of claim 14, wherein the at least one alpha-sulfo fatty acid disalt is a compound of formula (I):

$$R^1CH(SO_3M^1)COOM^2 \quad (I),$$

wherein R$^1$ is a linear or branched alkyl or alkylene radical having 6 to 16 carbon atoms, and
   wherein M$^1$ and M$^2$ are each independently selected from the group consisting of H, Li, Na, K, Ca, Mg, ammonium, and alkanolamine.

16. The method of claim 15, wherein R$^1$ is a saturated linear alkyl radical having 8 to 16 carbon atoms.

17. The method of claim 15, wherein M$^1$ and M$^2$ are Na.

18. The method of claim 15, wherein the aqueous gypsum composition further comprises at least 0.001% by weight of at least one cosurfactant other than an alpha-sulfo fatty acid disalt, relative to the total weight of the aqueous gypsum composition.

19. A process for producing a gypsum board comprising the steps of
   providing a foam comprising a foam former, the foam former comprising at least one alpha-sulfo fatty acid disalt;
   providing a composition comprising water and gypsum, and optionally comprising additives;
   allowing shear forces to act on the composition with addition of the foam; and
   drying the obtained composition thermally;

wherein the gypsum has a recycled gypsum content of at least 0.5% by weight, based on the total weight of gypsum.

20. A gypsum board obtained by thermally drying an aqueous gypsum composition comprising:
  at least 40.0% by weight of gypsum, and
  at least 0.002% by weight of a foam former comprising at least one alpha-sulfo fatty acid disalt, each weight percentage based on the total weight of the aqueous gypsum composition, and
  wherein the gypsum has a recycled gypsum content of at least 0.5% by weight, based on the total weight of gypsum.

* * * * *